United States Patent

[11] 3,628,953

[72] Inventor Eric Maria Brinckman
 Mortsel, Belgium
[21] Appl. No. 763,354
[22] Filed Sept. 27, 1968
[45] Patented Dec. 21, 1971
[73] Assignee Gevaert-Agfa N.V.
 Mortsel, Belgium
[32] Priority Sept. 27, 1967
[33] Great Britain
[31] 44,038/67

[54] THERMORECORDING
 21 Claims, No Drawings
[52] U.S. Cl. ..................................................... 96/36.3,
 96/115
[51] Int. Cl. .......................................................... G03c 5/00,
 G03c 1/72
[50] Field of Search ............................................ 250/65.1;
 96/36.3; 117/36.8

[56] References Cited
 UNITED STATES PATENTS
3,493,371 2/1970 Poot ............................ 96/33
3,514,288 5/1970 Silver ........................... 96/33

Primary Examiner—Norman G. Torchin
Assistant Examiner—Alfonso T. Suro Pico
Attorney—William J. Daniel ABSTRACT: Information is recorded by exposing to a heat image of such information a recording material carrying a recording layer consisting essentially of one or more of certain substantially solvent insoluble polymeric materials which, when exposed to heat, are rendered soluble in said solvent after which the image-wise heated layer is developed by contact with a liquid containing the solvent therefor so as to remove the heated areas from the layer. Preferably, the layer contains homogeneously distributed therethrough a dye or pigment which absorbs visible light or infrared radiation and converts the same to heat so that the exposure can be effected by exposing the layer to an image of such radiation.

THERMORECORDING

The present invention relates to a method for recording and reproducing information by means of heat, which by absorption in a thermosensitive layer increases the solubility of said layer in a proper solvent medium.

From the U.S. Pat. Specification No. 3,121,162 of Pierre Amedée Roman and Maurice Edgar Pfaff, issued Feb. 11, 1964 a reproduction process is known, which comprises irradiating with infrared radiation a subject having heat-absorptive image areas in heat-conductive contact with a supported layer of high-jelly strength gelatin, sufficiently to raise the temperature of the gelatin substantially in regions of said heat-absorptive image areas so that a substantial increase in swelling tendency of the gelatin in said areas is caused, moistening the gelatin layer and pressing it into contact with an absorbent support to cause the gelatin in said areas to adhere to said support, and separating the gelatin layer from said support to leave a stratum of the gelatin of said areas on the support.

There has been found now a method for recording information, whereby e.g., images are produced suited for decorative or printing purposes, which comprises: imagewise heating a layer mainly containing a compound or mixture of compounds selected from the list in the following table:

Table

1. A galactomannan which is a glucoside having the following structural units:

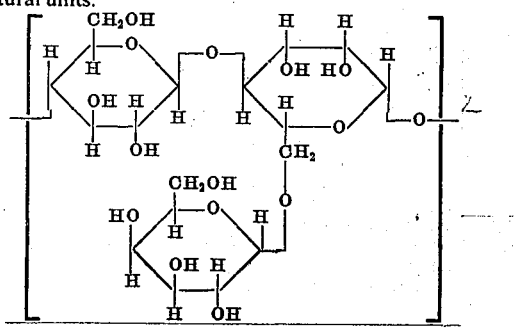

2. a cationic hydroxypropyl starch (the viscosity of a 5 percent solution in water at 25° C. is preferably 5 P);

3. a hydroxypropylmethylcellulose preferably having a DS (degree of substitution) methoxyl: 1.7–1.8; DS hydroxypropoxyl: 0.1–0.2; the viscosity of a 2 percent solution in water at 20° C. is preferably 45 P;

4. a cellulose acetate butyrate preferably having a DS acetate: 0.4–0.5; DS butyrate: 2.4; the viscosity of a 20 percent solution in acetone at 20° C. is preferably 17 P; of 0.80.

5. a melamine-formaldehyde resin, methylol melamine resin, or wholly or partially etherified methylol melamine resin, e.g., a methylated methylol melamine resin, which resins are of the water-soluble type and which after coating are preferably weakly hardened by adding an inorganic or organic compound containing acidic groups, by a moderate nondifferential heat-treatment, or simply by keeping prior to recording the coated recording layer at room temperature for some weeks. Suitable additives containing acidic groups are, e.g., citric acid, ascorbic acid, boric acid, maleic anhydride, phosphoric acid, gallic acid, barbituric acid, 2,4-dihydroxy-benzoic acid, p-amino-salicylic acid, stearic acid, itaconic acid, mandelic acid, succinic acid, methacrylic acid and polyacrylic acid;

6. an anionic water-soluble urea-formaldehyde resin, which after coating is preferably weakly hardened by a moderate nondifferential heat-treatment or simply by keeping prior to recording the coated recording layer at room temperature for some weeks;

7. a resorcinol formaldehyde resin soluble in ethanol or in a mixture of ethanol and water and which becomes soluble in water alone by heating;

8. a composition containing a water-soluble polyvinyl alcohol mixed with a compound containing (a) reactive carbonyl group(s) e.g., formaldehyde or 1,4-dichloro-2,3-butanedione.

The reaction with formaldehyde probably results in the formation of an acetal grouping of the following type:

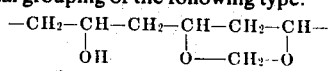

An essential condition for obtaining a product that is soluble in water is the use of formaldehyde in an amount that is considerably smaller than that of the polyvinylalcohol;

9. a composition containing an acidic compound and a water-insoluble polymer containing a basic nitrogen-containing heterocyclic nucleus of the type present in the following recurring unit:

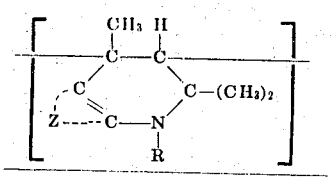

wherein:

Z represents the necessary atoms to complete an aromatic nucleus including a substituted aromatic nucleus, and R represents hydrogen or a group which maintains the basic properties of the nitrogen atom to which it is attached, e.g., an aliphatic hydrocarbon group or substituted aliphatic hydrocarbon group, e.g., an alkyl group or aralkyl group, more particularly a methyl or benzyl group.

As acidic compound, e.g., hydrochloric acid, acetic acid, or a polymer or a copolymer of an $\alpha,\beta$-ethylenically unsaturated compound containing a carboxylic or sulphonic acid group, e.g., polyacrylic acid, polystyrene sulphonic acid, copoly(methacrylic acid/styrene), copoly(acrylic acid/N-vinyl-pyrollidone), copoly(acrylic acid/acrylamide), copoly(methacrylic acid/methyl methacrylate), methacrylic acid, and analogous compounds are preferably used. The acidic compound is preferably used in a weight ratio of 20–400 percent in respect of the basic polymer, more preferably in a weight ratio of 50 TO 300 percent. As basic polymer preferably poly(1,2-dihydro-2,2,4-trimethylquinoline) is used. The said composition becomes soluble in water on heating;

10. a water-soluble polymer or copolymer of an $\alpha,\beta$-ethylenically unsaturated compound containing one or more carboxylic acid groups, e.g., polyacrylic acid, in admixture with a reactive compound forming a product with said polymeric compound, which product is less soluble in water than said polymeric compound and that on heating is dissociated again resulting in an increase of the solubility in water of the composition. Suitable reactive compounds for that purpose are cobalt naphthenate and 2,4-dihydroxy benzophenone;

11. Alginic acid esters, preferably hydroxyalkyl esters, e.g., 2-hydroxypropylalginate, which become more soluble in water;

12. a cresol-formaldehyde resin of the Novolak type, optionally mixed with a peroxide compound, e.g., cumene hydroperoxide;

13. a phenol-formaldehyde resin of the Novolak type, optionally mixed with a peroxide compound, e.g., cumene hydroperoxide. is, The Novolak resins are prepared in a manner similar to that used for the preparation of resole resins. The distinguished exception in this preparation is, however, that the reaction is conducted in an acidic medium, instead of an alkaline medium as is the case with resoles. In a typical synthesis Novolaks are prepared by heating one mole of the phenol or cresol with 1 to 0.5 mole of formaldehyde in an acidic medium. The temperature at which the reaction is conducted is generally from about 25° C. to about 175° C.

14. Polymers including copolymers containing azogroups linked through a carbon atom to a nitrile group, preferably polymers comprising groups of the following structure:

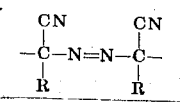

wherein:

R represents a lower alkyl group ($C_1$—$C_5$), preferably a methyl group.

The preparation of polymers containing such groups is described in "Die Makromolekulare Chemie," 103 (1967) p. 301–303. Typical representatives are polyesters and polyamides containing the following structural group in their recurring units:

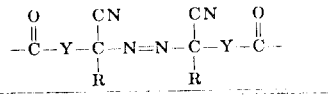

wherein:

R represents a lower alkyl group and Y a bivalent hydrocarbon radical preferably an alkylene radical of less than four carbon atoms.

Useful good results are obtained with a polyester or a polyamide having the following recurring units respectively:

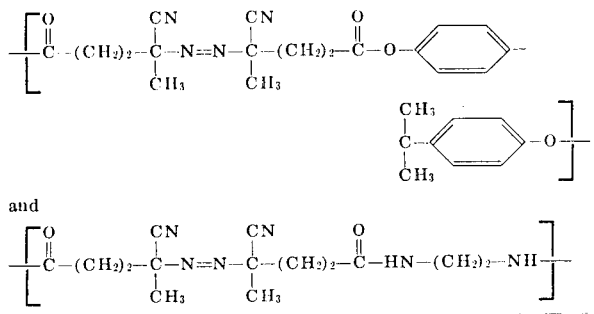

and 15. poly-N-vinylpyrrolidone;
16. crude and/or bleached shellac optionally in admixture with a peroxide compound, e.g., cumene hydroperoxide;
17. poly(1,2-dihydro-2,2,4-trimethylquinoline);
18. poly-N-vinylpyrrolidone in admixture with a water-soluble melamine-formaldehyde resin;
19. a composition containing polyvinyl alcohol or a partially hydrolized polyvinyl acetate mainly containing vinyl alcohol units, mixed with a quinone-diazide compound, e.g., as described in the French Pat. Spec. No. 1,511,337 filed Feb. 9, 1967 by Gevaert-Agfa N.V., together with an aldehyde preferably formaldehyde or a latent aldehyde preferably splitting off formaldehyde on heating e.g., dimethylolurea. As suitable quinone-diazide compounds are particularly mentioned: naphthoquinone-1,2-diazide(2)-5-sulfonylchloride and naphthoquinone-1,2-diazide(2)-4-sulfonylchloride;
20. phenol-formaldehyde resins whose solubility in ethanol has been improved by heating;
21. a copoly(styrene/N-vinylpyrrolidone) applied from a latex (aqueous dispersion). The recording layer formed with said latex undergoes an increase in solubility in a $C_1$—$C_3$ alkanol by heating;
22. a copoly(styrene/acrylate ester) applied from a latex, which copolymer undergoes an increase in solubility in a lower ketone. Preferably a latex of copoly(styrene/ethyl acrylate) (20/80) is applied:
23. a composition containing a copoly(butadiene/styrene) and an ortho-quinone-diazide compound, e.g., as described in the United Kingdom Pat. Specification No. 1,116,737 filed Feb. 28, 1966 by Gevaert-Agfa N.V., e.g., 2,2-bis(2-bromo-6-diazo-2,4-cyclohexadiene-4-yl-1-one)-propane and the ortho-quinone-diazide compounds splitting off an acid on heating as described in the Belgian Pat. Specification 674,218 filed Dec. 23, 1965 by Gevaert-Agfa N.V.

The imagewise heating according to the present invention results in the formation of a record in terms of a differentiation in permeability of the recording layer by, and solubility in, a solvent. Thus, if there are heated and nonheated portions then the permeability and solubility of the heated portions of the layer are greater than the permeability and solubility of the nonheated portions thereof.

The solvents for developing the information wise heated recording layer have to be selected from the group of solvents wherein the particular unheated recording layer composition is insoluble or less soluble. A simple heating test e.g., in a test tube, followed by a treatment with a liquid that is not a solvent for the unheated composition proves if whether or not an increase in solubility by heating has been obtained.

Thus the compounds or compositions one to 11 show an increase in water-solubility; the compounds 12 to 16 an increase in solubility in an alkaline aqueous medium, e.g., an aqueous solution having a pH 12; the compound 14 a rise in solubility in an ether-type solvent e.g., ethyl glycol or methyldiethyleneglycol; the compounds 16 to 21 a rise in solubility in a $C_1$—$C_3$ alkanol, e.g., ethanol; the compounds 21 and 22 a rise in solubility in a lower ketone containing $C_1$—$C_4$ carbon chains linked to the carbonyl group, e.g., acetone, and the composition 23 an increase in solubility in chlorinated aliphatic hydrocarbons, e.g., methylene chloride and carbon tetrachloride.

Up till now the best results have been obtained with the compositions five, nine, 12 and 13.

In consequence of the solvent permeability and solubility differentiation, the latent record resulting from the heating can be used to form a visible record in various ways as will hereafter be explained. In particular, the invention includes processes wherein after the information wise heating the recording layer is treated with a suitable liquid to bring about the formation of a visible image, to remove the heated or most heated areas of the recording layer, or to make possible a selective transfer of such portions to a receiving material.

In the case that the recording layer is heated according to the pattern of a printed text then there will be heated and substantially unheated portions in the recording layer. For convenience, reference is primarily made herein to heated and unheated portions but it is to be understood that the invention includes the recording of information, e.g., an original with tone gradation, by overall but differential heating of the recording layer.

In order to make the recording layer sufficiently insoluble in the processing liquid, e.g., water, before the imagewise heating, it is sometimes necessary i.a., in the case of the abovementioned melamine resins to dry the applied layer nondifferentially for a certain time at a temperature between 50° and 130° C. for 5 hours at 80° C. for 5 minutes at 120° C. The optional processing time and temperature should be determined experimentally, since too strong and too lengthy a heating causes an insolubility in water, which cannot be reversed by a rather short high-intensity heating.

Depending on the composition of the recording material a visible image can be formed by a subsequent development step, e.g., (1) by washing away the exposed portions of the recording layer with a suitable liquid, which is either or not colored by a dyestuff and can be absorbed in the nonheated portions, (2) by application of a liquid which selectively penetrates into the exposed portions effecting therein a visual change (coloration, discoloration or bleaching), and (3) by moistening with a suitable liquid the exposed recording material and selectively transferring in wet state the heated portions or a part thereof, e.g., a substance that can diffuse out of said portions, to a receiving material.

The composition of the recording layer, which may be a single self-supporting layer (i.e., a sheet) or a layer carried by a suitable support, can vary widely. It can incorporate various types of ingredients in addition to one or more compounds listed in the table. For example it may incorporate ingredients such as dyes, pigments, according to a particular embodiment nonmigratory dyes or pigments, electroconductive particles, e.g., carbon particles or metal particles, substances such as dispersed particles or dyes that can be bleached in or bleached out from the recording layer e.g., dyes suited for use in hectography, reaction components for the formation of dyes and/or catalysts for color reactions, light-sensitive substances, e.g., light-sensitive silver halide, developing substances, and/or developing nuclei for complexed silver halide salts. The layer may contain also reinforcing or filling agents and unreactive inorganic solids of small size including glass, mica, silica, bentonite, etc. Preferably these ingredients are used in a weight ratio in respect of the above selected polymers not surpassing 20 percent.

The capability of washing away with an aqueous liquid the heated portions of the recording layer containing compounds or compositions described above can be improved by incorporating water-soluble compounds into this layer in an amount that does not substantially disturb the selectivity of the washing away with such aqueous liquid, e.g., polyacrylic acid, polyacrylamide, poly-N-vinylpyrrolidone and polyoxyethylene resins.

In an analogous manner the washing away of the heated portions of recording layers that are not removable with an aqueous liquid can be improved by incorporating in the recording layer compounds which have a good solubility in (a) proper organophilic solvent(s).

The methods and materials according to the invention are intended primarily for reproduction of graphic originals e.g., line or halftone originals, but the invention is nevertheless capable of wider application e.g., for recording data applied as a heat pattern to the recording material responsive to transmitted signals.

The application of the heat pattern may be achieved by heating the image markings of an original while these are in heat-conductive relation with the recording material. Such heating may, e.g., be performed by exposing the original to infrared radiation, the image-markings being capable of absorbing such radiation, or by exposing the original to visible light of sufficient intensity if the image-markings are light-absorbing, the absorbed light being transformed into heat.

One way in which reproduction of matter such as typewritten documents may be performed is by placing the copying sheet with its heat-sensitive layer against the printed surface of the document, and then exposing the document to infrared radiation.

Absorption of radiation by the printed characters results in generation of heat, which is conducted to the heat-sensitive layer, thus producing a laterally reversed image in terms of the desired increase in solubility in the selected solvent. After washing away of the most soluble portions and occasionally coloring of the remaining image portions, an image is obtained, which is legible through the backing of the support if a transparent support is used.

If the recording layer contains dyes or reactive components soluble in a suitable printing liquid, the thus treated layer can be used as a matrix from which it is possible to obtain legible prints on a suitable receiving material, e.g., it can be used as a matrix for hectographic printing.

According to another embodiment the heat-sensitive layer is placed against the back or unprinted surface of the document during irradiation. The heat absorbed in the image markings is conducted through the backing towards the heat-sensitive layer. This "back-printing" method makes possible the production of a legible reproduction if the original is printed on a satisfactorily thin, heat-resistant, heat-conductive paper or other base material.

Selective heating of the recording materials used according to the present invention is, however, preferably realized by imagewise exposing a recording material, which contains electromagnetic radiation absorbing substance(s) converting absorbed electromagnetic radiation into heat. As electromagnetic radiation visible light and infra-red light are preferably used, but ultraviolet light and other energetic electromagnetic radiation as far as it can be converted into heat by absorption in proper substances is not excluded.

Some specific examples of substances absorbing visible light and infrared radiation and which are preferably present in the recording layer to provide an optical density for the copying light of at least 0.25 are i.a. finely divided carbon particles, e.g., carbon black and heavy metals in finely divided state e.g., silver, bismuth, lead, iron, cobalt, and nickel, oxides and sulphides of these metals, e.g., manganese dioxide, magnetic iron oxide ($Fe_3O_4$), chromium oxide (CrO), cobalt sulphide nickel sulphide lead sulphide and pigments and dyes such as Prussian blue and indigo. The particle size of these substances preferably does not exceed 0.1 $\mu$. These light-absorbing substances can be incorporated in the heat-sensitive layer or in an adjacent layer with the proviso that a heat-conductive relationship with the thermosensitive polymeric compound or composition exists.

Methods and apparatus, by which, using the heat-generating property of said substances, the recording material can be exposed to an original are described in the Belgian Pat. Specification Nos. 681,138 filed May 17, 1966 by Gevaert-Agfa N.V., 656,713 filed Dec. 4, 1964 by Gevaert Photoproducten N.V., 664,329 filed May 24, 1965 by Gevaert Photoproducten N.V., 682,767 filed June 20, 1966 by Gevaert-Agfa N.V., in the French Pat. Specification No. 1,481,830 filed June 2, 1966 by Gevaert-Agfa N.V., and also in the United Kingdom Pat. Specification No. 1,078,520 filed Dec. 5, 1963 by Gevaert Photoproducten N.V. The specifications of all such earlier Patent Specifications should be read in conjunction herewith and are deemed to form part of the present disclosure.

In recording an original according to a preferred embodiment of the invention, the recording material comprising electromagnetic radiation-absorbing substance(s) for heat production in the recording layer is preferably subjected to a short duration high-intensity exposure. During such exposure the image markings of the original may be in heat-conductive relationship with the heat-sensitive surface layer. The exposure time preferably does not exceed $10^{-1}$ second. In such very short exposure periods the heat is insufficiently accumulated in the image markings to be sufficiently conducted to the said surface layer and bring about an effective increase in solubility in water therein; on the other hand the light-absorbing substances in the solid recording layer are providing the necessary heat immediately to the surrounding polymer substances of the recording layer itself.

The short duration exposure may be performed by using a flash lamp preferably supplying a light energy of 100 to 1000 Watt sec. in a time interval of $10^{-5}$ to $10^{-2}$ seconds. Depending on the composition of the recording layer a more or less intense exposure energy is required. Normally an exposure energy of at least 0.1 Watt sec./cm.$^2$ is applied for obtaining a sufficient image differentiation.

Gas discharge lamps with a much lower energy output can be used, of course, if the emitted energy is focused onto a relatively small area of the recording material. Obviously, the exposure may be carried out progressively, in other words by exposing adjacent areas of the recording layer in successive order. The exposure is not necessarily a continuous one but can be executed by an intermittent flashing.

It should be emphasized that the development, i.e., the production of a visible image, should not necessarily be the result of the washing away of the heated portions of the recording layer, since a visible image can be obtained relying on the obtained increase in solvent-permeability and/or swellability in the proper solvent of the heated recording layer portions.

For suitable developing techniques based on the difference in water-permeability and swellability in water reference is made to the Belgian Pat. Specification Nos. 656,713 filed Dec. 4, 1964 by Gevaert Photo-Producten N.V. and 681,138 filed May 17, 1966 by Gevaert-Agfa N.V.

The present invention, however, is mainly intended for obtaining a copy of a printed text, line drawings, or screened originals by washing away the heated portions of the solid recording layer, which contains a colored pigment. If the recording layer is carried on a screenline support, e.g., a nylon gauze, Japan paper, or metal wire screen, a screen printing master is obtained by selectively washing away the recording layer. Although the removal of the heated portions of the solid recording layer according to a preferred embodiment is carried out with a pure solvent or solvent mixture in the case no alkali is needed, the development can also be carried out with solvent compositions, which to a minor extent, preferably less than 20 percent by weight, contain dissolved substances e.g., wetting agents or detergents, improving the selective removal of the heated portions of the recording layer. The same substances can enable the penetration into the nonheated portions of the recording layer of coloring substances, e.g., dye(s), dye forming component(s) or (a) catalyst(s) for a dye forming reaction.

When choosing a suitable support and an appropriate thickness of the recording layer the relief left after the washing away of the heated portions of the recording layer can be used for planographic (relief not very pronounced) or letterpress printing (pronounced relief). In planographic printing the relief portions of the base support portions can act as the printing portions. Printing is possible with a lipophilic ink as well as with a hydrophilic ink according to the composition of the recording layer and the subjacent layer or support. A planographic printing process wherein use is made of a hydrophilic ink is called "reversed planographic printing." For such a process and suitable inks reference is made to the Belgian Pat. Specification Nos. 676,898 filed Feb. 23, 1966, 705,534 filed Oct. 24, 1967 and 705,528 filed Oct. 24, 1967 all by Gevaert-Agfa N.V.

When letterpress printing reliefs are being prepared an after-hardening of the relief portions or application thereto of lacquer can be necessary, and if desired the support carrying the relief portions can be etched in the nonshielded portions and the resist image integrally removed before carrying out relief or intaglio printing.

In the preparation of letterpress printing reliefs the original is preferably an image-bearing transparency consisting solely of substantially opaque and substantially transparent areas where the opaque areas are of the same optical density, i.e., a so-called line or halftone negative. Both negative or positive transparencies can be used as originals.

Since light is passed essentially only through the clear areas in the transparency, the thermosensitive layer is exposed in the light paths under the clear areas in the transparency and, accordingly, is made more soluble by the heat generated in the said layer. The image of the clear areas of the transparency that is produced in the polymer layer or sheet, after removal of the portions with increased solubility, is intaglio, i.e., incised into the surface of the polymer layer or sheet. These incised areas constitute the nonprinting portions, of a letterpress plate. The ink-carrying portions, i.e., the printing relief, in such plates are those portions which were under the opaque area of the transparency and accordingly were not increased in solubility. In general, a positive transparency is used when the usual photoengraving procedure would employ a negative, and vice versa.

Depending on the type of polymer, the ingredients associated therewith and the intensity of heating, the increase in solubility by heating can be due to depolymerization, hydrolyzation, degradation, or transformation from nonpolar (nonionic—less water-soluble) to more polar (ionic—more water-soluble) character of the polymer.

The following examples illustrate the present invention without, however, limiting it thereto.

EXAMPLE 1

A subbed cellulose triacetate film was coated with a composition consisting of:
Eastman Cellulose Acetate Butyrate
EAB–500–5 (commercial name of Eastman
Chemical Products, Inc., Kingsport, Tenn.,
U.S.A. for cellulose acetate butyrate
of the following structural formula

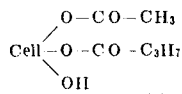

aqueous carbon black dispersion containing per 100
g.: 53 g. of carbon (particle size less than 0.1 µ), 23
g. of water, 18 g. of ethylene glycol
and 6 g. of nonylphenyl polyethylene oxide) 0.1 g.
water 98 ccs.

After drying of the coated layer the optical density (measured by transmission) of the recording material was 2.0.

The recording material was exposed through a halftone transparency by means of a flashlamp having an exposure time of $8.10^{-3}$ sec. and irradiating the material with an energy of 1.03 Watt sec./cm.$^2$.

The exposed material was rinsed in running water for 3 minutes whereby only the exposed portions of the recording layer were washed away. A positive black copy of the original was obtained.

EXAMPLE 2

A subbed cellulose triacetate film was coated with a dispersion consisting of:
CERON CN (trade name of The Hercules
Powder Company Inc., Wilmington, Del.,
U.S.A., for a cationic hydroxypropyl
starch of the following general formula:

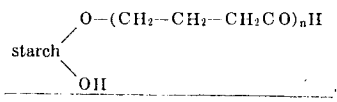

carbon black dispersion as described in example 1 1 g.
water 490 ccs.

After drying of the coated layer, the optical density (measured by transmission) of the recording material was 0.71.

The recording material was exposed reflectographically while in contact with an opaque line original by means of an electronic flashlamp irradiating the recording material with an energy of 1.01 Watt sec./cm.$^2$.

The exposed recording material was moistened with water and pressed against a sheet of common paper. After peeling apart the sheet materials, a legible black negative image of the original remained on the paper sheet.

EXAMPLE 3

A subbed cellulose triacetate film was coated with the following dispersion:

hydrolyzed polyvinyl acetate having from 97.5–99.5%
 of acetyl groups replaced by hydrolysis (the
 viscosity at 20° C. of a 4% aqueous solution is 5
 c.p.s.) 25 g.
20% aqueous solution of formaldehyde 25 ccs.
carbon black dispersion as described in example 1 1 g.
water 250 ccs After drying of the coated layer, the optical density (measured by transmission) of the recording material was 0.34.

The exposure and processing were the same as described in example 1. A black positive image was obtained.

EXAMPLE 4

A subbed cellulose triacetate film was coated with the following dispersion:

a 80% by weight aqueous dispersion of PAREZ
 RESIN 6 B (a dimethyltrimethylol-melamine-
 formaldehyde resin
 sold by American Cyanamid Company, New York,
 N.Y., U.S.A.) 44 g.
carbon black dispersion of example 1 1 g.
water 80 ccs After drying of the coated layer for 1 hr. at 80° C., the optical density (measured by transmission) of the recording material was 0.26.

After an exposure as described in example 2, a black positive copy of the original legible through the transparent cellulose triacetate support was obtained by rubbing the recording layer by means of a plug of wadding soaked with water.

EXAMPLE 5

A subbed cellulose triacetate film was coated with a dispersion consisting of:

| | |
|---|---|
| poly(1,2-dihydro-2,2,4-trimethyl-quinoline) (sold by Monsanto Chemical Company, St. Louis, Mo., U.S.A., under the trade name FLECTOL H) | 5 g. |
| polyacrylic acid | 6 g. |
| ethanol | 95 ccs. |
| carbon black dispersion of example 1 | 4 g. |

After drying of the coated layer, the optical density (measured by transmission) of the recording material was 2.63. The exposure was the same as described in example 1. The exposed portions of the recording layer were selectively removed by rubbing with a plug of wadding soaked with water.

A positive black copy of the original was obtained.

EXAMPLE 6

A subbed cellulose triacetate film was coated with a dispersion consisting of:

| | |
|---|---|
| water | 68 ccs. |
| a 80% aqueous solution of a partially etherified melamine-formaldehyde resin sold under the trade name CASSURIT MLP by Casella Farbwerke Mainkur A.G., Frankfurt (Main), W. Germany | 92 g. |
| aqueous carbon dispersion as mentioned in example 1 | 1 g. |

After having been dried for 20 min. at 90° C. the resulting material has an optical density (measured by transmission) of 0.28. The material was exposed as described in example 1. The exposed areas were then removed by rubbing with a plug of wadding soaked with water.

A greyish-black copy was obtained from the original.

EXAMPLE 7

A subbed cellulose triacetate film was coated with a dispersion consisting of:

| | |
|---|---|
| water | 120 ccs. |
| 60% neutral solution of a cold-hardenable resorcinol-formaldehyde resin in a mixture of equal parts of ethanol and water (viscosity at 20° C.: 300 c.p.s.) | 44 ccs. |
| Aqueous carbon dispersion as described in example 1 | 1 g. |

After having been dried the material had an optical density (measured by transmission) of 0.80.

The material was exposed as described in example 1. The exposed areas were removed by washing with water. A black positive image was obtained.

EXAMPLE 8

A subbed cellulose triacetate film was coated with a dispersion consisting of:

| | |
|---|---|
| water | 200 ccs. |
| anionic urea-formaldehyde resin (sold under the trade name BEETLE RESIN BC 32 by BIP Chemicals Ltd., Oldbury, Birmingham, England) | 24 g. |
| aqueous carbon dispersion as described in example 1 | 1 g. |

After having been dried the material showed an optical density (measured by transmission of 0.90.

The material was exposed as described in example 1. The exposed areas were removed by washing with water. A black positive image was obtained.

EXAMPLE 9

A subbed cellulose triacetate film was coated with a dispersion consisting of:

| | |
|---|---|
| water | 65 ccs. |
| 1% aqueous solution of a galactomannan | 42 ccs. |
| aqueous carbon dispersion as described in example 1 | 1 g. |
| 11.5% aqueous solution of saponine | 1 cc. |

After having been dried, this material had an optical density (measured by transmission) of 0.64.

The material was exposed as described in example 1. The exposed areas were removed by holding the material under a vigorous water jet. A black copy was obtained from the original.

EXAMPLE 10

A subbed cellulose triacetate film was coated with a dispersion consisting of:

| | |
|---|---|
| poly(1,2-dihydro-2,2,4-trimethyl-quinoline) (sold by Monsanto Chemical Company St. Louis, Mo., U.S.A., under the trade name FLECTOL H) | 1 g. |
| 1% solution of a low molecular weight poly(styrene-p-sulphonic acid) in ethanol | 75 g. |
| aqueous carbon dispersion as described in example 1 | 2 g. |

After having been dried, the material had an optical density (measured by transmission) of 1.08.

The material was exposed as described in example 1. The exposed areas were rubbed away by means of a plug of wadding soaked with water. A black copy was obtained from the original.

EXAMPLE 11

A subbed polyethylene terephthalate film was coated with a dispersion consisting of:

| | |
|---|---|
| ethanol | 42 ccs. |
| poly(1,2-dihydro-2,2,4-trimethyl-quinoline) (sold by Monsanto Chemical Company, St. Louis, Mo., U.S.A. under the trade name FLECTOL H) | 2.5 g. |
| methacrylic acid | 6 g. |
| carbon dispersion as described in example 1 | 2.5 g. |

After having been dried, the material had an optical density (measured by transmission) of 1.63.

The material was exposed as described in example 1. The exposed areas were rubbed away by means of a plug of wadding soaked with water. A black copy was obtained from the original.

EXAMPLE 12

The following ingredients were ball-milled for 6 hours:

| | |
|---|---|
| bleached shellac | 25 g. |
| ethanol | 225 ccs. |
| carbon black (average particle size 0.1 μ) | 1 g. |

A subbed polyethylene terephthalate support was coated with the resulting dispersion, in such a way that upon drying a heat-sensitive material with an optical density (measured by transmission) of 0.48 was obtained.

The material was then exposed as described in example 1. The exposed areas were removed by rubbing the material with a plug of wadding soaked with an aqueous 0.6 percent solution of sodium hydroxide. A black positive copy, which could also be used as a printing plate for offset printing, was obtained.

EXAMPLE 13

The following ingredients were ball-milled for 3 hours:

| | |
|---|---|
| phenol-formaldehyde resin, type Novolak | 25 g. |
| carbon black (average particle size 0.1 μ) | 1 g. |
| acetone | 225 g. |

The Novolak-type phenol-formaldehyde resin was prepared according to the following procedure:

20 moles of phenol were mixed with 50 ccs. of concentrated hydrochloric acid and heated till the temperature of 85° C. was reached. At this temperature 15 moles of formaldehyde from a commercial 30 percent formalin-solution were added and the reaction temperature was increased till 100° C. The reaction mixture was kept at that temperature till the smell of formaldehyde had disappeared. The resin formed was washed with water at 90°–100° C. and from the resinous mass the excess of phenol was removed by vacuum distillation at 170° C./12 mm. Hg. The brittle resinous mass left on cooling was powdered in a ball-mill.

A polyethylene terephthalate support was coated with the resulting dispersion in such a way that upon drying the obtained material had an optical density (measured by transmission) of 0.43. The material was exposed reflectographically as described in example 2 and rinsed in a 0.6 percent aqueous solution of sodium hydroxide. A black positive print of the original remained on the film.

EXAMPLE 14

The following ingredients were ball-milled for 4 hours:

| | |
|---|---|
| bleached shellac | 25 g. |
| carbon black (average particle size 0.1 $\mu$) | 225 g. |
| cumene hydroperoxide | ethanol |
| | 5 g. |

A copper plate was coated with the resulting dispersion so as to form thereon a heat-sensitive layer, which upon drying was 7 $\mu$ thick. The material was exposed as described in example 1. The plate was then rinsed in a 1 percent aqueous solution of sodium hydroxide, whereby the exposed areas were washed away. Subsequently the plate was dipped for 10 min. in a 10 percent aqueous iron (III) chloride solution and rinsed with pure water, whereupon the still remaining heat-sensitive layer was removed with acetone. An imagewise etched copper plate was obtained.

EXAMPLE 15

The following ingredients were ball-milled for 6 hours and applied to a subbed polyethylene terephthalate film support:

| | |
|---|---|
| poly(N-vinylpyrrolidone) (average molecular weight 40,000) | 12 g. |
| ethanol | 20 ccs. |
| water | 80 ccs. |
| carbon black (average particle size 0.1 $\mu$) | 0.3 g. |

The resulting heat-sensitive material had an optical density (measured by transmission) of 0.70 after drying.

The material was exposed as described in example 1, and rinsed with a 0.5 percent aqueous solution of sodium hydroxide. A black positive image was obtained.

EXAMPLE 16

The following ingredients were ball-milled for 12 hours:

| | |
|---|---|
| phenol-formaldehyde resin, type Novolak (prepared analogously to the preparation of example 13) | 10 g. |
| cobalt(II) sulphide | 4 g. |
| cumene hydroperoxide | 0.5 g. |
| ethanol | 60 ccs. |

The resulting dispersion was applied to a subbed polyethylene-terephthalate film support in such a way that upon drying the material had an optical density (measured by transmission) of 0.44. After exposure of the material as described in example 1, the exposed areas were removed by rubbing with a plug of wadding soaked with a 0.6 percent aqueous solution of sodium hydroxide. A grey positive image was obtained.

EXAMPLE 17

The following ingredients were ball-milled for 12 hours:

| | |
|---|---|
| bleached shellac | 10 g. |
| manganese dioxide | 2 g. |
| ethanol | 60 ccs. |

The resulting dispersion was applied to a subbed polyethylene terephthalate support, so that upon drying the optical density of the material (measured by transmission) was 0.44. After exposure of the material as described in example 1, the exposed areas were removed by rubbing with a plug of wadding soaked with a 0.6 percent aqueous solution of sodium hydroxide. A black positive image was obtained.

EXAMPLE 18

The following ingredients were ball-milled for 6 hours:

| | |
|---|---|
| ethanol | 50 ccs. |
| cresol-formaldehyde resin, type Novolak (prepared analogously to the preparation of example 13) | 10 g. |
| Milori-blue (C.I. Pigment Blue 27) | 3 g. |

The resulting dispersion was applied to a subbed cellulose triacetate support provided with a gelatin layer having a weight of 7 g./sq. m. The thickness of the heat-sensitive layer was 11 $\mu$ after drying. The resulting material was exposed as described in example 1. The exposed portions were removed by dipping in an 0.6 percent aqueous solution of sodium hydroxide. A blue positive image was obtained.

EXAMPLE 19

A subbed polyethylene terephthalate film was coated with a solution of 5 g. of cresol-formaldehyde resin, type Novolak (prepared analogously to the preparation of example 13) in 48 g. of ethanol, so that upon drying a layer having a thickness of 5 $\mu$ was formed. A covering layer consisting of the following ingredients was applied thereto:

| | |
|---|---|
| 8% aqueous solution of gelatin | 1 g. |
| carbon dispersion as described in example 1 | 1 g. |
| 5% aqueous solution of a polyoxyethylene resin having a melting point of 66° C. and a viscosity of 300 c.p.s. at 25° C. | 9 g. |
| water | 36 g. |
| ethanol | 10 g. |
| 11.5% aqueous solution of saponine | 1 g. |

After having been dried, the resulting heat-sensitive material had an optical density (measured by transmission) of 0.86. The material was exposed as described in example 1. The complete covering layer was removed with running water. Subsequently the material was rinsed for 1 min. in a 0.6 percent aqueous solution of sodium hydroxide, whereby the exposed areas of the cresol-formaldehyde resin layer dissolve. This can be observed by coloring the freed parts of the substratum of the polyethylene terephthalate film by means of a 1 percent aqueous solution of a dye e.g., crystal violet. The alkali treated material can be used i.a. as a positive offset printing plate.

EXAMPLE 20

A paper support weighing 90 g./sq. m. was coated with a solution consisting of:

| | |
|---|---|
| water | 92 g. |
| gelatin | 6 g. |
| 10% dispersion of black colloidal silver in water | 4 g. |
| 11.5% aqueous solution of saponine | 1 g. |
| 20% aqueous solution of formaldehyde | 1 g. |

The resulting layer contained 0.27 g. of silver per sq. m. and was coated with a covering layer consisting of a solution of 5 g. of cresol-formaldehyde resin, type Novolak prepared analogously to the preparation in example 13 in 48 g. of ethanol. The dried covering layer was 6 $\mu$ in thickness. The material was exposed as described in example 1, dipped for 45 sec. in a 0.6 percent aqueous solution of sodium hydroxide, rinsed for a while in water, and dipped for 10 sec. in a bleaching bath comprising 15 g. of potassium bromide and 15 g. of potassium hexacyanoferrate(III) per liter of water. A black positive image was obtained since the bleaching only occurred at the exposed areas of the heat-sensitive material, where the heated cresol-formaldehyde resin covering layer was removed by the sodium hydroxide solution.

EXAMPLE 21

A subbed polyethylene terephthalate support was coated with a solution comprising:

| | |
|---|---|
| ethanol | 150 ccs. |
| poly(N-vinylpyrrolidone) | 3 g. |
| dimethylolmelamine-formaldehyde resin (a 20% aqueous solution has a pH 8.2) | 14 g. |
| Sudan brown BB (C.I. 12,020) | 1 g. |

The dried heat-sensitive layer was 8 $\mu$ in thickness. It was brought in contact with an original and exposed reflectographically to infrared radiation in a secretary-apparatus of MMM of Saint Paul, Minn. (U.S.A.). The parts of the heat-sensitive layer that were heated according to the image areas of the original could be removed by rubbing with a plug of wadding soaked with water. A brown negative print was obtained from the original.

EXAMPLE 22

A subbed cellulose-triacetate support was covered with a coating composition for a heat-sensitive recording layer from a dispersion consisting of:

| | |
|---|---|
| a 10% solution in ethanol/water (1:9) of polyvinyl alcohol with a hydrolysation degree of 73–76% (viscosity of a 4% aqueous solution: 7 c.p.s.) | 300 ccs. |
| a 10% aqueous solution of dimethylolurea | 200 ccs. |
| a 1% solution of naphthoquinone-(1,2)-diazide-(2)-5-sulphofluoride in acetone | 100 ccs. |
| carbon dispersion as described in example 1 | 3 g. |

The dried heat-sensitive material had an optical density (measured by transmission) of 0.64. The material was exposed as described in example 1 and rinsed in ethanol. A black positive print was obtained from the original. Using no carbon dispersion in the coating composition no differentiation after exposure and rinsing could be detected.

EXAMPLE 23

A subbed polyethylene terephthalate film was coated with a dispersion obtained by ball-milling the following ingredients for 6 hours:

| | |
|---|---|
| methylene chloride | 88 ccs. |
| carbon black | 0.3 g. |
| a nonhardenable phenol-formaldehyde resin whose solubility in ethanol increases by heating, sold under the trade name SUPER-BECKACITE-G 3094 by Reichold Chemie A.G., Hamburg, W. Germany (melting point: 130° C.) | 12 g. |

The dried material had an optical density (measured by transmission) of 0.28.

The material was exposed as described in example 1. The exposed areas were rubbed away by means of a plug of wadding soaked with ethanol. A grey black copy was obtained from the original.

EXAMPLE 24

A subbed polyethylene terephthalate film was coated with a dispersion consisting of:

| | |
|---|---|
| a 40% anionic emulsion of a copoly (styrene-N-vinylpyrrolidone) (93/7) in water | 30 ccs. |
| water | 70 ccs. |
| carbon dispersion as described in example 1 | 0.3 g. |

The dried material had an optical density (measured by transmission) of 0.25. The material was exposed as described in example 1 and rinsed in ethanol. A positive print was obtained from the original.

EXAMPLE 25

The following ingredients were ball-milled for 6 hours:

| | |
|---|---|
| copoly(butadiene-styrene) (15/85) (a 33.5% solution in xylene has a viscosity of 195 c.p.s. at 25° C.) | 50 g. |
| 2,2-bis(2-bromo-6-diazo-2,4-cyclohexadiene-4-yl-1-one)-propane | 5 g. |
| carbon black (average particle size: 0.1 $\mu$) | 2 g. |
| methylene chloride | 500 ccs. |

The resulting dispersion was applied to a polyethylene terephthalate support so that upon drying an optical density (measured by transmission) of 0.94 was obtained. The material was exposed as described in example 1 and rinsed in carbon tetrachloride. A black positive print was obtained from the original. Repeating the whole procedure, using no light-absorbing pigment in the heat-sensitive layer, no differentiation during rinsing could be obtained.

EXAMPLE 26

The following ingredients were ball-milled for 12 hours:

| | |
|---|---|
| crude shellac | 10 g. |
| FeO.Fe$_2$O$_3$ (average particle size 0.1 $\mu$) | 4 g. |
| ethanol | 60 ccs. |

The resulting fine dispersion was applied as such to a subbed polyethylene terephthalate film support in such a way that upon drying a layer of 16 $\mu$ thickness was obtained. The material was exposed as described in example 1. The exposed portions were removed by rubbing with a plug of wadding soaked with ethanol. A red-brown positive image was obtained.

EXAMPLE 27

A subbed polyethylene terephthalate film support was coated with a dispersion comprising:

| | |
|---|---|
| nonionogenic 38% by weight aqueous dispersion of copoly(styrene/ethyl acrylate ester) (20/80) | 10 ccs. |
| water | 90 ccs. |
| carbon dispersion as described in example 1 | 0.3 g. | psitive dried heat-sensitive material had an optical density (measured by transmission) of 0.30. It was exposed as described in example 1 and then rinsed with acetone. A positive copy was obtained from the original.

EXAMPLE 28

A polyethylene terephthalate support provided with a gelatin-containing subbing layer composition offering more hydrophilic surface properties than the polyethylene terephthalate itself was coated with a solution comprising:

| | |
|---|---|
| ethanol | 50 g. |
| PHENOL-formaldehyde resin, type Novolak (prepared as described in example 13) | 5 g. |

The dried heat-sensitive layer was 16 $\mu$ in thickness. It was brought in contact with a reversed negative silver image and exposed reflectographically to infrared radiation in a "Secretary" apparatus of Minnesota Mining and Manufacturing Company, St. Paul, Minn., U.S.A. The parts of the heat-sensitive layer that were heated according to the image areas of the original could be removed by rubbing with a plug of wadding soaked with a 0.6 percent aqueous solution of sodium hydroxide. After treating the coated side of the film with a lithographic solution containing 5 g. of gum arabic and 1 g. of phosphoric acid 85 percent in 100 ccs. of distilled water, a positive offset printing plate was obtained.

EXAMPLE 29

The following ingredients were ball-milled for 17 hours:

| | |
|---|---|
| isopropanol | 1000 g. |
| polyacrylic acid | 125 g. |

| | |
|---|---|
| carbon black (average particle size: 0.1 μ) | 31 g. |
| Crystal Violet (C.I. 42,555) | 117 g. |

To the resulting dispersion was added a solution of 39 g. of poly(1,2-dihydro-2,2,4-trimethylquinoline) in 320 g. of isopropanol. The whole was coated on a subbed polyethylene terephthalate film at a ratio of 75 g. per sq. m and dried.

The recording material was then exposed through a silver image line transparency (the silver image side was in contact with the recording layer) by means of a flash lamp having an exposure time of $8.10^{-3}$ sec. The material was irradiated with an energy of 1.03 Watt sec./cm.$^2$. The exposed areas were rubbed away by means of a plug of wadding soaked with water. A reversed positive image of the original transparency was obtained. That image was used as a master in hectographic printing whereby several right reading violet copies were obtained.

EXAMPLE 30

A subbed cellulose triacetate film was coated with a composition consisting of:

| | |
|---|---|
| demineralized water | 280 ccs. |
| aqueous carbon black dispersion as described in example 1 | 100 g. |
| 2% solution of 2-hydroxy-propyl alginate in demineralized water | 600 ccs. |
| 12% solution of saponine in demineralized water | 20 ccs. |

After drying of the coated layer, the optical density (measured by transmission) of the recording material amounted to 3.20.

The recording material was exposed twice through a halftone transparency by means of a flashlamp having an exposure time of $8.10^{-3}$ sec. and yielding an energy of 1.03 Watt sec. per cm.$^2$.

The exposed material was rinsed in running water for 5 sec. whereby only the exposed portions of the recording layer were washed away. A positive black copy of the original was obtained.

EXAMPLE 31

A subbed polyethylene terephthalate film was coated at a ratio of 90 g. per sq. m with a composition consisting of:

| | |
|---|---|
| demineralized water | 510 ccs. |
| poly(N-vinylpyrrolidone) | 70 g. |
| dimethylolmelamine-formaldehyde resin whose pH was 8.2 in a 20% aqueous solution | 70 g. |
| Heliogen Grun G.N. Colanyl Teig (a green phthalocyanine pigment dye C.I. 74,260—marketed by Badische Anilin—& Soda-Fabrik A.G., Ludwigshafen a/Rh., W. Germany) | 30 g. |
| 5% solution of the compound having the formula: | |

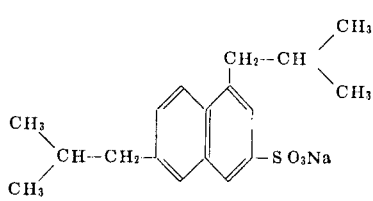

| | |
|---|---|
| in a mixture of ethanol and demineralized water (1:1) | 20 ccs. |

After drying, the heat-sensitive layer was brought into contact with an original and exposed reflectographically to infrared radiation in a Secretary apparatus of Minnesota Mining and Manufacturing Company, St. Paul, Minn., U.S.A. The parts of the heat-sensitive layer that were heated according to the image areas of the original were removed by rubbing with a plug of wadding soaked with ethanol. A green negative print of the original was obtained.

EXAMPLE cellulose triacetate film was coated at a ratio of 30 g. per sq. m. with a composition consisting of:

| | |
|---|---|
| demineralized water | 770 ccs. |
| 80% aqueous solution of a dimethyltrimethylolmelamine-formaldehyde resin | 100 g. |
| ascorbic acid | 20 g. |
| 10% solution of isooctylphenyl polyethylene oxide in demineralized water | 70 ccs. |
| aqueous carbon black dispersion as described in example 1 | 30 g. |

After drying of the coated layer the recording material was coated reflectographically while in contact with an opaque line original by means of an electronic flashlamp irradiating the recording material with an energy of 0.43 Watt sec./cm.$^2$ and having an exposure time of $2.10^{-3}$ sec.

Further, the areas of the recording layer corresponding with the white areas of the original were selectively removed by rubbing with a plug of wadding soaked with water.

A positive black copy of the original was obtained.

EXAMPLE 33

To a solution of 5 g. of poly(1,2-dihydro-2,2,4-trimethylquinoline) in 30 ccs. of a 5 percent aqueous solution of hydrochloric acid was added a composition consisting of:

| | |
|---|---|
| demineralized water | 74 ccs. |
| polyethylene glycol having an average molecular weight of 200 | 5 g. |
| aqueous carbon black dispersion as described in example 1 | 4 g. |

The resulting dispersion (pH 2) was coated on a subbed cellulose triacetate film in such a way that upon drying the resulting material had an optical density (measured by transmission) of 1.36.

The recording material was exposed through a halftone transparency by means of a flashlamp having an exposure time of $2.10^{-3}$ sec. and irradiating the material with an energy of 0.51 Watt sec./cm.$^2$. The exposed areas were then removed by rubbing with a plug of wadding soaked with water. A black copy of the original was obtained.

EXAMPLE 34

The following ingredients were ball-milled for 6 hours:

| | |
|---|---|
| ethanol | 74 g. |
| 18.5% solution of polyacrylic acid in isopropanol | 20 g. |
| carbon black | 2 g. |
| 2,4-dihydroxy-benzophenone | 4 g. |

The resulting dispersion was coated on a subbed polyethylene terephthalate film in such a way that upon drying the resulting material had an optical density (measured by transmission) of 5.50. The recording material was exposed as described in example 1. The exposed areas were then removed by rubbing with a plug of wadding soaked with water. A black copy of the original was obtained.

EXAMPLE 35

The following ingredients were ball-milled for 6 hours:

| | |
|---|---|
| methylene chloride | 50 g. |
| carbon black (average particle size: 0.1 μ) | 1 g. |
| a polyamide containing the following recurring units: | |

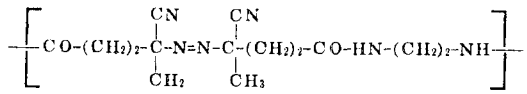

| | |
|---|---|
| prepared according to a method as described in Die Makromolekulare Chemie, 103 (1967) p. 301–303 | 5 g. |

The resulting dispersion was coated onto a subbed polyethylene terephthalate film in such a way that after drying the resulting material had an optical density (measured by transmission) of 0.80. The recording material was exposed as described in example 1 and the exposed portions were removed by rubbing with a plug of wadding soaked with a 2 percent aqueous solution of trisodium ortho phosphate. A greyish black positive image of the original was obtained.

What we claim is:

1. A method of recording information comprising the steps of
    1. imagewise heating a recording material comprising a recording layer consisting essentially of a substantially solvent-insoluble polymeric material which when exposed to heat becomes soluble in said solvent which polymeric material is selected from the group consisting of:
    1. galactomannan
    2. a cationic hydroxypropyl-starch
    3. a hydroxypropylmethyl-cellulose
    4. a cellulose acetate butyrate
    5. a melamine-formaldehyde resin, a methylol-melamine resin or an etherified methylol-melamine resin of the water-soluble type, which resins are weakly hardened after coating
    6. an anionic water-soluble urea-formaldehyde resin, which is weakly hardened after coating
    7. a resorcinol-formaldehyde resin soluble in ethanol or in a mixture of water and ethanol, and which becomes soluble in water alone by heating
    8. a composition containing a water-soluble polyvinyl alcohol mixed with a compound containing at least one reactive carbonyl group
    9. a composition containing an acidic compound and a water-insoluble polymer containing a basic nitrogen-containing heterocyclic nucleus of the type present in the following recurring unit:

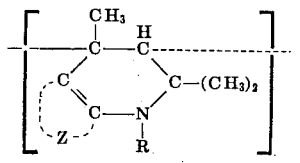

wherein:
Z represents the necessary atoms to complete an aromatic nucleus and
R represents hydrogen or a group that maintains the basic properties of the nitrogen atom to which it is attached,
    10. a water-soluble polymer or copolymer of an α,β-ethylenically unsaturated compound containing at least one carboxylic acid group and in admixture therewith a reactive compound forming a product with said unsaturated compound that is less soluble in water than the α,β-ethylenically unsaturated compound and that on heating is dissociated again resulting in an increase of the solubility in water of the composition.
    11. an alginic acid ester
    12. a cresol-formaldehyde resin of the Novolak type
    13. a phenol-formaldehyde resin of the Novolak type
    14. a polymer containing an azo group linked through a carbon atom to a nitrile group
    15. poly-N-vinylpyrrolidone
    16. crude and/or bleached shellac
    17. poly(1,2-dihydro-2,2,4-trimethylquinoline)
    18. poly-N-vinylpyrrolidone in admixture with a water-soluble melamine-formaldehyde resin
    19. a composition containing polyvinyl alcohol or a partially hydrolized polyvinyl acetate mainly containing vinyl alcohol units, mixed with a quinone-diazide compound and an aldehyde or latent aldehyde splitting off formaldehyde on heating
    20. a phenol-formaldehyde resin whose solubility in ethanol is increased by heating
    21. a copoly(styrene/N-vinylpyrrolidone) applied from a latex, undergoing an increase in solubility in ethanol by heating
    22. a copoly(styrene/acrylate ester) applied from a latex and undergoing an increase in solubility in acetone by heating
    23. a composition containing a copoly(butadiene/styrene) and an o-quinone-diazide compound, and
    2. developing the image-wise heated layer by contacting the same with a liquid containing said solvent and removing the heated areas from said layer.

2. A method of recording information according to claim 1, wherein the recording layer consists essentially of at least one of the materials listed under the numbers one to 11, and after the imagewise heating is contacted with water to remove the heated areas of the recording layer.

3. A method of recording information according to claim 1, wherein the recording layer consists essentially of at least one of the materials listed under the numbers 12 to 16 and after the imagewise heating is contacted with an alkaline aqueous liquid to remove the heated areas of the recording layer.

4. A method of recording information according to claim 1, wherein the recording layer consists essentially of at least one of the materials listed under the numbers 16 to 21 and after the imagewise heating is contacted with a $C_1$—$C_3$ alkanol to remove the heated areas of the recording layer.

5. A method of recording information according to claim 1, wherein the recording layer consists essentially of at least one of the compounds 21 or 22 and after the imagewise heating is contacted with a lower ketone to remove the heated areas of the recording layer.

6. A method of recording information according to claim 1, wherein the recording layer consists essentially of the composition 23 and after the imagewise heating is contacted with a chlorinated aliphatic hydrocarbon compound to remove the heated areas of the recording layer.

7. A method of recording information according to claim 1, wherein the recording layer contains uniformly distributed therethrough a dye or pigment, which is capable of absorbing infrared radiation and/or visible light and converting the same to heat.

8. A method of recording information according to claim 1, wherein said imagewise heating is carried out by arranging said recording layer in contact with an original to be copied carrying information markings of infrared radiation absorbing material and exposing the resultant sandwich infrared radiation to heat said original markings and by conduction therefrom the contacting areas of said recording layer.

9. A method of recording information according to claim 1, wherein the recording layer contains a hectographic dye soluble in lower alcoholic solvents.

10. A method according to claim 1, wherein the polymer listed under number 14, comprise groups of the following structure:

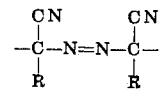

wherein R represents a lower alkyl group.

11. A method according to claim 1, wherein the polymer listed under number 14 is a polyester or polyamide containing the following structural group in their recurring units:

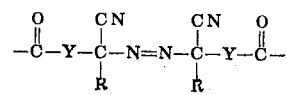

wherein: R represents a lower alkyl group, and Y represents a bivalent hydrocarbon radical.

12. The method of claim 1 wherein the heated areas of said layer are removed by rinsing away with said solvent-containing liquid.

13. The method of claim 1 wherein said rinsing is accompanied by rubbing.

14. The method of claim 1 wherein said heated areas are removed by softening the same with said solvent-containing liquid and transferring to a receiving material brought into pressure contact therewith and separated.

15. A method of recording information according to claim 7, wherein said dye or pigment is susceptible to bleaching to render the same colorless.

16. A method of recording information according to claim 7, wherein the imagewise heating is carried out by imagewise exposure to radiation which is absorbed by said dye or pigment in the recording layer and converted into heat, the exposure being of a degree sufficient to render removable the heated portions of the recording layer when wet with said liquid.

17. A method of recording information according to claim 16, wherein the exposure is a high-intensity imagewise exposure of not more than about 0.1 sec. duration.

18. A method of recording information according to claim 16, wherein the recording layer contains diffusion-resistant dyes or pigments.

19. A method of recording information according to claim 13, wherein the exposure is carried out by means of a flash lamp emitting a larger part of visible light than of infrared radiation.

20. A method of claim 18 wherein said polymeric compound is a Novolak resin of formaldehyde and a hydroxyphenyl compound.

21. An article of manufacture which comprises a layer containing an acidic compound and a water-insoluble polymer containing a basic nitrogen-containing heterocyclic nucleus of the type present in the following recurring unit:

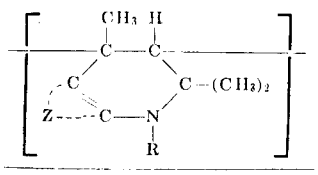

wherein:

Z represents the necessary atoms to complete an aromatic nucleus including a substituted aromatic nucleus, and R represents hydrogen or a group which maintains the basic properties of the nitrogen atom to which it is attached.

* * * * *

UNITED STATES PATENT OFFICE
CERTIFICATE OF CORRECTION

Patent No. 3,628,953  Dated December 21, 1971

Inventor(s) Eric Marie BRINCKMAN

It is certified that error appears in the above-identified patent and that said Letters Patent are hereby corrected as shown below:

Column 19, Claim 19, line 22, change "13" to -- 17 --.

Column 20, Claim 20, line 2, change "18" to -- 1 --.

Signed and sealed this 6th day of June 1972.

(SEAL)
Attest:

EDWARD M. FLETCHER, JR.
Attesting Officer

ROBERT GOTTSCHALK
Commissioner of Patents